Sept. 19, 1950  F. G. ZAGAR  2,522,736
PARALLEL MOTION MULTIPLE SPINDLE HEAD
Filed Dec. 2, 1947  2 Sheets-Sheet 2
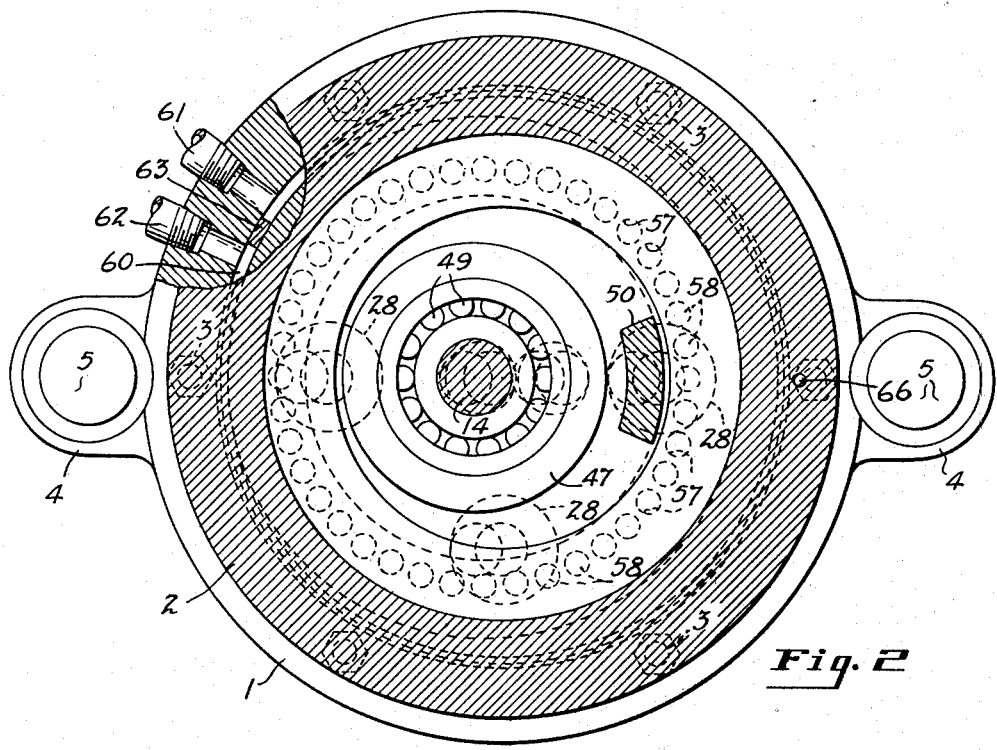
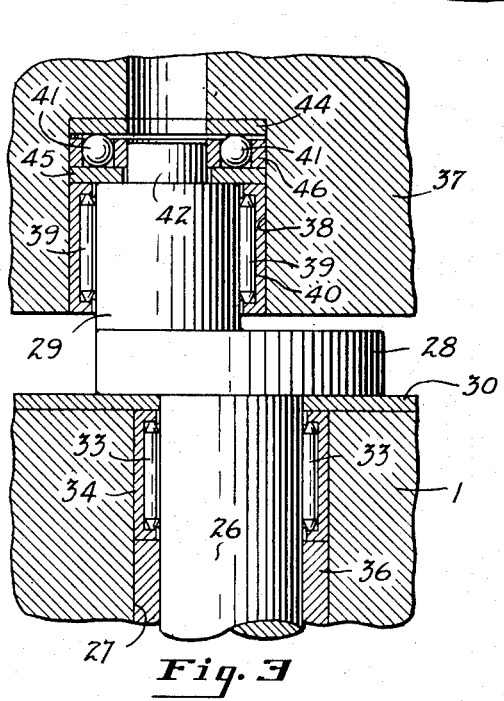
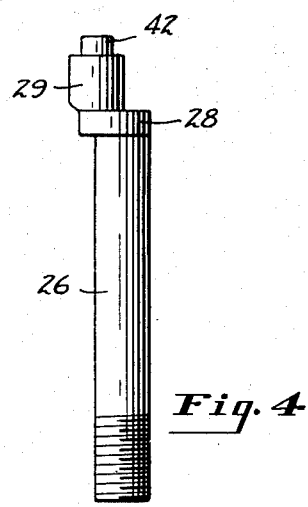
INVENTOR
Frank G. Zagar
BY Evans & McCoy
ATTORNEYS Patented Sept. 19, 1950

2,522,736

UNITED STATES PATENT OFFICE 2,522,736

PARALLEL MOTION MULTIPLE SPINDLE HEAD

Frank G. Zagar, Euclid, Ohio, assignor to Zagar Tool, Inc., Cleveland, Ohio, a corporation of Ohio Application December 2, 1947, Serial No. 789,183

7 Claims. (Cl. 74—63)

This invention relates to multiple spindle heads of a parallel motion driving plate type, and particularly to heads such as drill press heads in which the spindles are subjected to end thrust during operation.

This invention has for an object to provide a head in which the friction of the spindle bearings and the resultant heating of the head is reduced to a minimum.

A further object of the invention is to provide a head which can be quickly and easily assembled, and which permits the tool spindles to be readily removed and interchanged.

With the above and other objects in view, the invention may be said to comprise the head as illustrated in the accompanying drawings hereinafter described and particularly set forth in the appended claims, together with such variations and modifications thereof as will be apparent to one skilled in the art to which the invention pertains.

Reference should be had to the accompanying drawings forming a part of this specification, in which:

Fig. 2 is a horizontal section taken on the line indicated at 2—2 in Fig. 1;

Fig. 3 is a fragmentary vertical section on an enlarged scale, showing the bearings for the spindles and the spindle crank pins; and Fig. 4 is a side elevation of one of the spindles.

Figure 1:
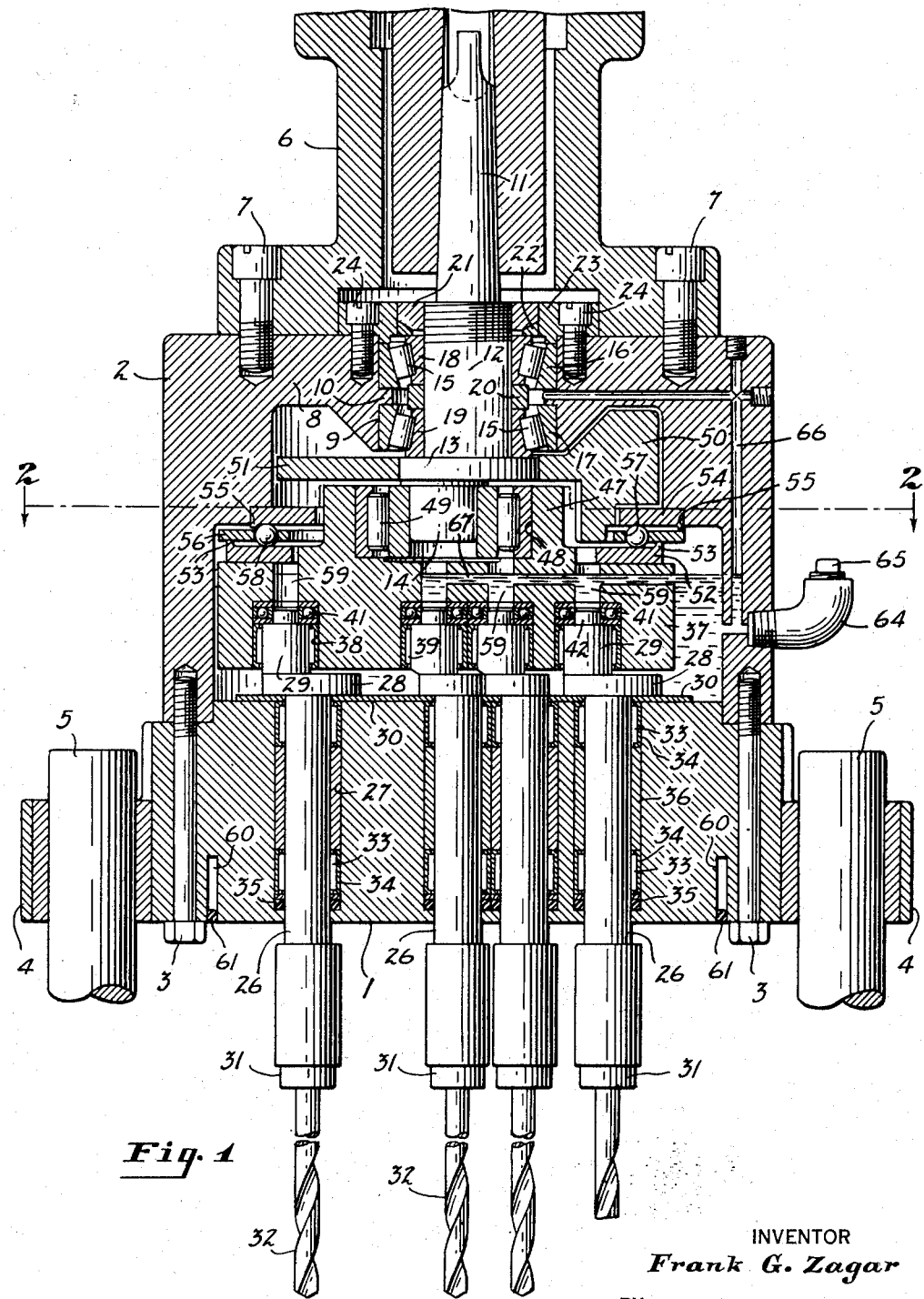
Figure 1 is a vertical, axial section through a drill press head embodying the invention.

In the accompanying drawings the invention is shown applied to a drill press head which is in the form of a housing having a bottom plate 1 and a cup-shaped body portion 2 detachably secured to the bottom plate 1 by suitable means such as bolts 3. The plate 1 has diametrically opposite integral projections 4 which are apertured to receive vertical guide posts 5 which are fixed to a stationary support such as the bed of a press (not shown).

To the top of the body 2 an extension sleeve 6 is detachably secured by suitable means such as bolts 7. The sleeve 6 is centrally positioned and is adapted to be secured to the vertically movable carriage of a press. The body portion 2 of the housing has a top wall 8 provided with a central opening 9 that is counterbored from the top and bottom to provide an inwardly projecting rib 10 intermediate the top and bottom of the opening. A drive spindle 11 extends through the opening 9 and has an enlarged portion 12 that is journaled in the opening 9. Within the housing the lower end of the spindle 11 is provided with a round flat crank flange 13 which carries a crank pin 14 that is offset radially with respect to the axis of the spindle.

The enlarged portion 12 of the spindle is journaled in a roller thrust bearing 15 which has outer race rings 16 and 17 seated in the opening 9 above and below the rib 10. Upper and lower race rings 18 and 19 are mounted on the enlarged portion 12 of the spindle, a spacing washer 20 being interposed between the races 18 and 19. The lower race rings 19 rest on the flange 13 and the rings 18 and 19 and washer 20 are clamped by means of a lock nut 21 and lock washer 22, the nut 21 being screwed upon the upper end of the enlarged portion 12 of the spindle and the lock washer 22 being interposed between the nut and the ring 18. The upper race rings 18 are held in place by means of a clamping ring 23 secured to the top 8 of the housing by means of bolts 24. The outer race rings 16 and 17 have conical interior faces which are oppositely tapered, the inner faces of the lower rings tapering upwardly, and the inner faces of the upper rings tapering downwardly. The roller engaging faces of the rings 18 and 19 are also conical, having a smaller angle of taper so as to accommodate the conical rollers of the bearing 15.

A group of vertical spindles 26 are mounted in the bottom plate 1 of the housing, each of the spindles 26 being journaled in an opening 27 formed in the plate 1. Each spindle 26 has an integral crank flange 28 within the housing 2, the flange 28 having flat upper and lower faces and carrying a crank pin 29 that projects upwardly therefrom and that is offset radially from the axis of the spindle 26 the same distance that the crank pin 14 is offset from the axis of the spindle 11.

A bearing plate 30 of bronze or other suitable bearing metal rests upon the top face of the bottom plate 1 and is apertured to receive the spindles 26 so that the under sides of the crank flanges 28 may bear upon the plate 30. At their lower ends each of the spindles 26 has a suitable clamping collet 31 detachably secured thereto for securing a tool such as a drill bit 32. The spindles 26 are freely slidable in the plate 1 and are journaled in suitable radial bearings 33 which are preferably of the needle roller type, the rollers being mounted in suitable retaining sleeves 34. Each spindle is preferably provided with two bearings 33, the lower bearing resting upon a suitable oil sealing ring 35 near the bottom face of the plate 1 and the upper bearing resting upon spacer sleeves 36 and being positioned adjacent the top face of the plate 1.

Within the housing 2 a driving plate 37 is provided which has downwardly opening sockets 38 on its under side to receive the crank pins 29. Needle bearings 39 mounted in the sockets 38 receive the crank pins 29 and ball thrust bearings 41 are interposed between the crank pins 29 and the bottoms of the sockets 38. Each of the crank pins 29 has a short central extension 42 of reduced diameter which serves to position the thrust bearing 41 which has an upper race ring 44 engaging the bottom of the socket 38 and a lower race ring 45 resting on the shoulder surrounding the extension 42 at the top of the crank pin 29. The race rings 44 and 45 are in the form of flat washers and the balls of bearing 41 are retained in a cage 46 interposed between the race rings 44 and 45. During drilling operations the end thrust on the spindles 26 is transmitted through the ball thrust bearings 41 to the driving plate 37. The driving plate 37 has a central upwardly projecting portion 47 in which is provided an upwardly opening socket 48 to receive the crank pin 14 which is journaled in a radial roller bearing 49 mounted in the socket 48. In order to reduce vibration, a suitable counterweight 50 is attached to the spindle 11, the counterweight 50 being carried by a flat disk 51 that is provided with a central opening that has a press fit on the flange 13 of the spindle.

The vertical thrust to which the driving plate 37 is subjected during operation of the machine is transmitted through a suitable thrust bearing directly to the body portion 2 of the housing. The thrust bearing is preferably in the form of a ball thrust bearing having the lower race ring 52 mounted upon the top of the plate 37, the ring 52 being of an external diameter such that it lies adjacent the periphery of the plate 37. The ring 52 has a flat top face and a short upwardly projecting rib 53 adjacent its outer periphery. An upper race ring 54 overlies the ring 52 and is attached to the housing body 2. The ring 54 has a flat bottom face opposed to the flat top face of the ring 52 and is provided with a short downwardly projecting rib 55 along its outer periphery. Between the rings 52 and 54 there is mounted a cage 56 in the form of a flat disk which is slidably supported upon the rib 53 of the lower ring 52. The cage 56 is provided with a circumferential row of openings 57 which receive bearing balls 58 which have rolling engagement with the flat faces of the rings 52 and 54. During operation the plate 37 moves in a circular path and the balls 48 transmit the thrust from the plate 37 to the housing body 2. The cage 56 and balls 58 are free to move radially with respect to the rings 52 and 54, the extent of the radial movement being limited by the rib 55 on the upper rib 54 which is in the path of the balls 58 and serves to limit the radial movements of the balls and cage.

The interior of the housing 2 forms a lubricant chamber and in order to provide free circulation of oil through the bearings openings 59 are provided from the sockets 38 to the top of the plate 37. The sockets 38 are all entirely below the bottom of the socket 48 which receives the drive spindle crank pin so that some of the sockets 38 may be disposed directly beneath the drive spindle. The openings 59 from the sockets so positioned open into the bottom of the sockets 48 so that oil may be circulated through the bearing 49 as well as the bearings for the tool spindles.

The plate 1 may be provided with suitable means such as a passage 60 for circulation of a liquid coolant. As herein shown, the coolant passage 60 is provided by forming a circular slot opening to the bottom of the plate 1 and sealing the open end of the slot by means of a packing ring 61.

The coolant may be circulated through the slot 60 by means of a pressure pipe 61 and an exhaust pipe 62 connected to the passage 60 on opposite sides of a suitable stop 63.

Liquid lubricant is maintained at a suitable level within the housing 2 and the movement of the driving plate 37 is utilized to pump the lubricant to the upper bearings. To facilitate the maintenance of the proper oil level in the housing a filling connection in the form of an elbow 64 closed by a plug 65 is provided. Upon removal of the plug 65 the level of the liquid may be ascertained and oil may be supplied through the elbow 64 to bring the oil to the desired level in the housing. The housing 2 has a passage 66 leading to the bearing 15 and a suitable passage 67 in the plate 37 supplies oil to the bearings 49.

By transmitting the end thrust of all of the driven spindles through the driving plate to the housing through a single thrust bearing, the bearing friction due to end thrust on the spindles is reduced to a minimum and excessive heating of the head is avoided. Since the driven spindles 26 are freely slidable in the bearings in the bottom plate 1 and the crank pins 29 are freely slidable in the bearings in the driving plate sockets, the bottom plates and the spindles are removable simply by removing the bolts 3 and the spindles are removable from the plate 1 upon detachment of the collets 31 so that the spindles can be quickly and easily detached and replaced. The driving plate 37 is also readily detachable from the spindle 11 so that driving plates and spindle supporting plates designed to accommodate various groupings of driven spindles may be quickly replaced when desired.

It is to be understood that variations and modifications of the specific devices herein shown and described for purposes of illustration, may be made without departing from the spirit of the invention.

What I claim is:

1. In a device of the character described, a housing defining a downwardly opening lubricant chamber having a top wall, a detachable bottom wall for said lubricant chamber spaced from said top wall, a driving spindle passing through and journaled in said top wall, said driving spindle having a crank and crank-pin at its lower end within said lubricant chamber, a driving plate in said lubricant chamber, said plate having an upwardly facing socket receiving the crank-pin of the driving spindle and a plurality of downwardly facing sockets, a plurality of driven spindles passing through said bottom wall and slidably journaled therein without restraint against upward axial thrusts thereon, each of said driven spindles having a crank and crank-pin at its upper end with the crank-pin journaled in an aligned one of said downwardly facing sockets, bearing means for transmitting to said driving plate substantially all upward axial thrusts applied to said driven spindles, and bearing means between said housing and said driving plate for transmitting from the driving plate directly to said housing upward axial thrusts received by the driving plate from said driven spindles.

2. In a device of the character described, a housing defining a downwardly opening lubricant chamber having a top wall, a detachable bottom wall for said lubricant chamber spaced from said top wall, a driving spindle passing through and journaled in said top wall, said driving spindle having a crank and crank-pin at its lower end within said lubricant chamber, a driving plate in said lubricant chamber, said plate having an upwardly facing socket receiving the crank-pin of the driving spindle and a plurality of downwardly facing sockets, a plurality of driven spindles passing through said bottom wall and slidably journaled therein without restraint against upward axial thrusts thereon, each of said driven spindles having a crank and crank-pin at its upper end with the crank-pin journaled in an aligned one of said downwardly facing sockets, bearing means for transmitting to said driving plate substantially all upward axial thrusts applied to said driven spindles, and a thrust bearing interposed between the top wall of said housing and said driving plate for transmitting from the driving plate directly to the top wall of the housing upward axial thrusts received by the driving plate from said driven spindles.

3. In a device of the character described, a housing defining a downwardly opening lubricant chamber having a top wall, a detachable bottom wall for said lubricant chamber spaced from said top wall, a driving spindle passing through and journaled in said top wall, said driving spindle having a crank and crank-pin at its lower end within said lubricant chamber, a generally horizontal driving plate in said lubricant chamber, said plate having an upstanding boss on its upper side and an upwardly facing socket therein for receiving the crank-pin of the driving spindle, a plurality of downwardly facing sockets in the lower side of said driven plate, a plurality of driven spindles passing through said bottom wall and slidably journaled therein without restraint against upward axial thrusts thereon, each of said driven spindles having a crank and crank-pin at its upper end with the crank-pin journaled in an aligned one of said downwardly facing sockets for transmitting to said driving plate substantially all upward axial thrusts applied to the driven spindle, and a thrust bearing surrounding the upstanding boss on said driven plate and interposed between the upper side of the driven plate and the lower face of the top wall of said housing.

4. In a device of the character described, a housing defining a downwardly opening lubricant chamber having a top wall, a detachable bottom wall for said lubricant chamber spaced from said top wall, a driving spindle passing through and journaled in said top wall, said driving spindle having a crank and crank-pin at its lower end within said lubricant chamber, a driving plate in said lubricant chamber, said plate having an upwardly facing socket receiving the crank-pin of the driving spindle and a plurality of downwardly facing sockets, a plurality of driven spindles passing through said bottom wall and slidably journaled therein without restraint against upward axial thrusts thereon, each of said driven spindles having a crank and crank-pin at its upper end with the crank-pin journaled in an aligned one of said downwardly facing sockets, a ball thrust bearing interposed between the bottom of each of said downwardly facing sockets and the top of the crank pin journaled therein for transmitting to said driving plate substantially all upward axial thrusts applied to said driven spindles, and a ball thrust bearing interposed between the top wall of said housing and said driving plate for transmitting from the driving plate directly to the top wall of the housing upward axial thrusts received by the driving plate from said driven spindles.

5. A device according to claim 1 in which the bearing means between said housing and said driving plate comprises a race ring mounted on said driving plate and having a flat top annular face of greater radial width than the radius of the driving spindle crank, a second race ring overlying the first and having a flat annular under face of greater radial width than the radius of the driving spindle crank, and a cage interposed between said race rings for holding a circular row of bearing rollers in rolling engagement with the annular faces of said race rings.

6. A device according to claim 1 in which the bearing means between said housing and said driving plate comprises superposed race rings respectively attached to the top of said driving plate and to the top wall of said housing, an annular floating cage interposed between said rings for holding circumferentially spaced bearing balls in rolling engagement with said rings, and axially projecting ribs along the margins of said rings in the path of lateral movement of said balls for limiting movement of the balls in radial directions.

7. A device according to claim 1 in which the bearing means between said housing and said driving plate comprises a first race ring mounted on said housing concentrically with said driving spindle, a second race ring mounted on said driving plate concentric with the crank-pin of said driving spindle and eccentrically with respect to said first race ring, an annular cage interposed between said rings, a circular array of bearing balls mounted in said cage in spaced apart relation and in rolling engagement with said rings, and axially projecting ribs extending around the peripheries of said race rings, said ribs projecting toward each other into the path of lateral movement of said balls for retaining the balls between oppositely disposed surface areas of said rings.

FRANK G. ZAGAR.

REFERENCES CITED

The following references are of record in the file of this patent:

UNITED STATES PATENTS

| Number | Name | Date |
| --- | --- | --- |
| 543,719 | Berger | July 30, 1895 |
| 584,910 | Warner | June 22, 1897 |
| 800,722 | Crandoll | Oct. 3, 1905 |
| 1,281,785 | Kellow | Oct. 15, 1918 |
| 1,326,863 | Heinkel | Dec. 30, 1919 |
| 1,696,468 | Buhr | Dec. 25, 1928 |
| 2,342,251 | Burt | Feb. 22, 1944 |
| 2,369,345 | Folke | Feb. 13, 1945 |